United States Patent
Stewart et al.

(10) Patent No.: US 6,687,773 B1
(45) Date of Patent: Feb. 3, 2004

(54) BRIDGE FOR COUPLING DIGITAL SIGNAL PROCESSOR TO ON-CHIP BUS AS MASTER

(75) Inventors: Charles H. Stewart, Richardson, TX (US); Keith D. Dang, Lewisville, TX (US)

(73) Assignee: LSI Logic Corporation, Milpitas, CA (US)

(*) Notice: Subject to any disclaimer, the term of this patent is extended or adjusted under 35 U.S.C. 154(b) by 306 days.

(21) Appl. No.: 09/847,849

(22) Filed: Apr. 30, 2001

Related U.S. Application Data
(60) Provisional application No. 60/270,063, filed on Feb. 20, 2001.

(51) Int. Cl.[7] .................... G06F 13/38; G06F 13/40
(52) U.S. Cl. .................. 710/65; 710/306; 710/311; 710/315; 370/402
(58) Field of Search .................. 710/65, 306, 311, 710/315; 370/402

(56) References Cited

U.S. PATENT DOCUMENTS

| | | | | |
|---|---|---|---|---|
| 5,712,986 A | * | 1/1998 | Vo | 713/600 |
| 6,128,673 A | * | 10/2000 | Aronson et al. | 710/22 |
| 6,295,568 B1 | * | 9/2001 | Kelley et al. | 710/305 |
| 6,529,847 B2 | * | 3/2003 | Hamilton et al. | 702/127 |
| 6,567,881 B1 | * | 5/2003 | Mojaver et al. | 710/313 |
| 6,571,308 B1 | * | 5/2003 | Reiss et al. | 710/315 |

* cited by examiner

Primary Examiner—Rehana Perveen
(74) Attorney, Agent, or Firm—Conley, Rose & Tayon

(57) ABSTRACT

A bridge for connecting a DSP to an ASIC on-chip bus as a master on the bus. The bridge includes a DSP instruction unit master interface and a DSP data unit master interface to convert DSP instruction unit and data unit external signals into bus protocol signals. An arbiter is provided to receive the signals from the two DSP interfaces and selectively pass the signals to a generic bus master which couples the signals to the on-chip bus. A synchronization unit is provided to insure alignment of positive clock transitions between the different clock frequencies of the ASIC and the DSP and to buffer signals as needed. The generic bus master couples signals from the arbiter and the synchronization unit to the ASIC bus in full compliance with the bus protocol.

22 Claims, 9 Drawing Sheets

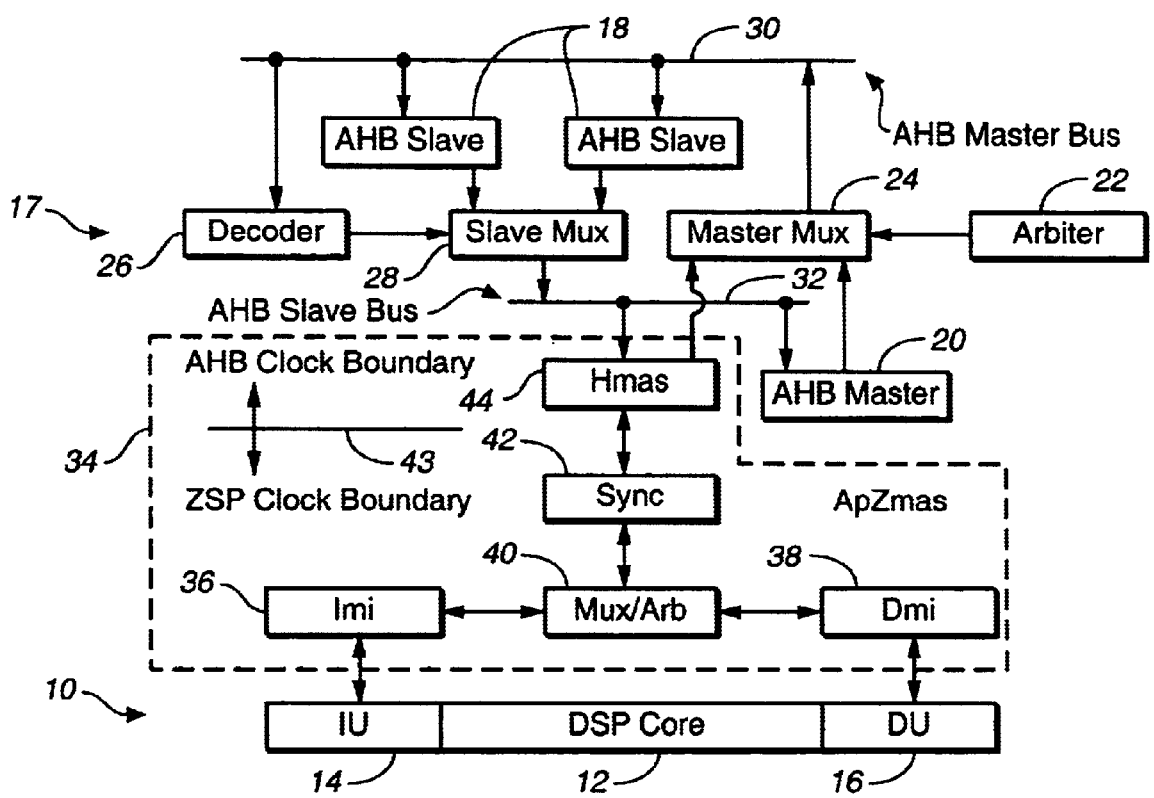
FIG._1

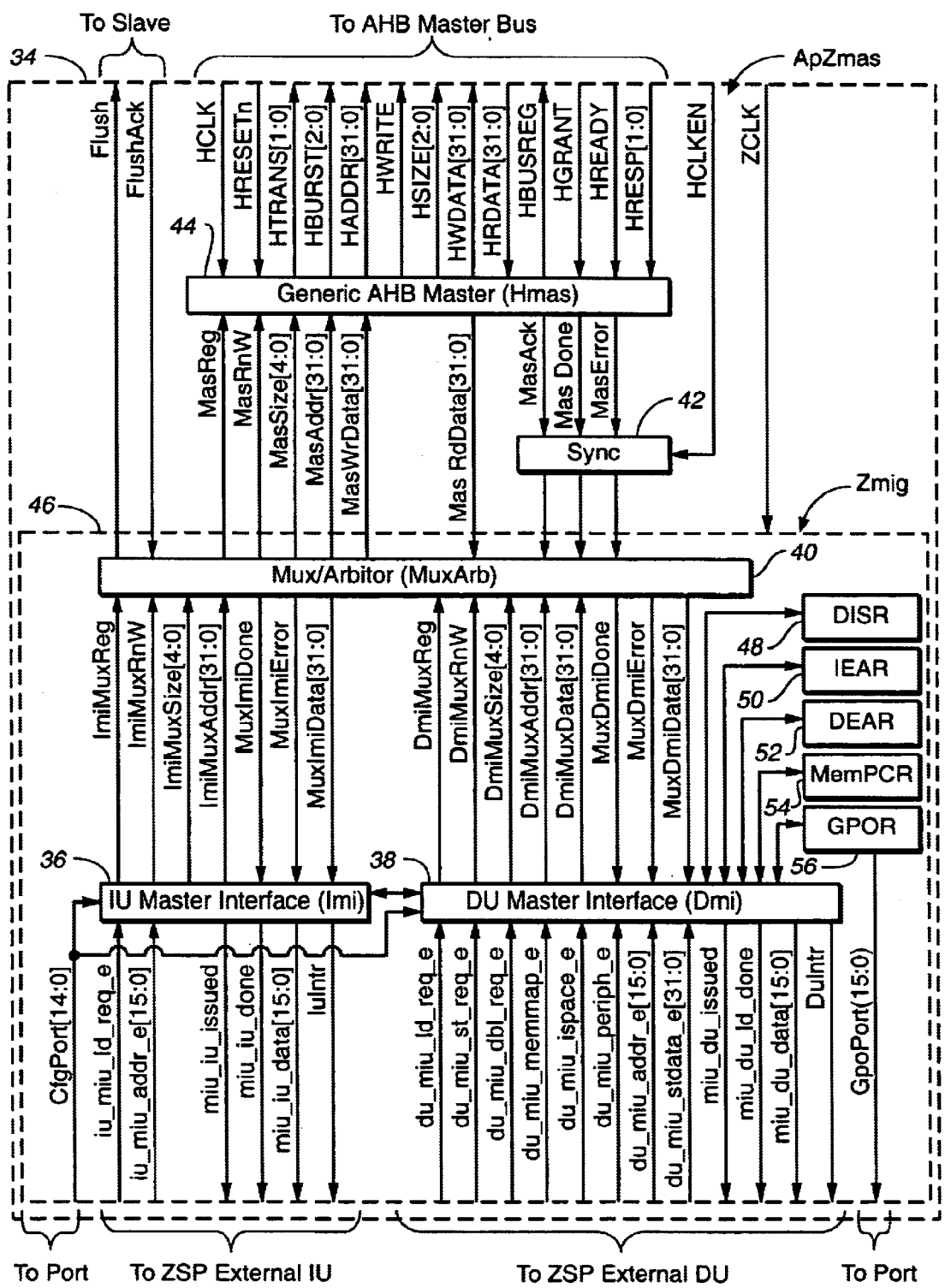
FIG._2

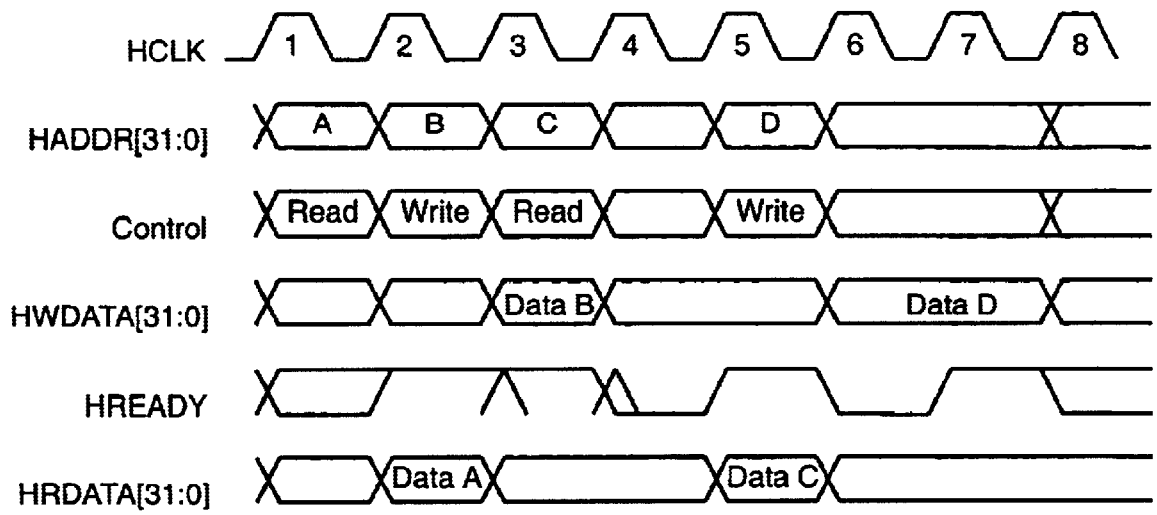
FIG._3
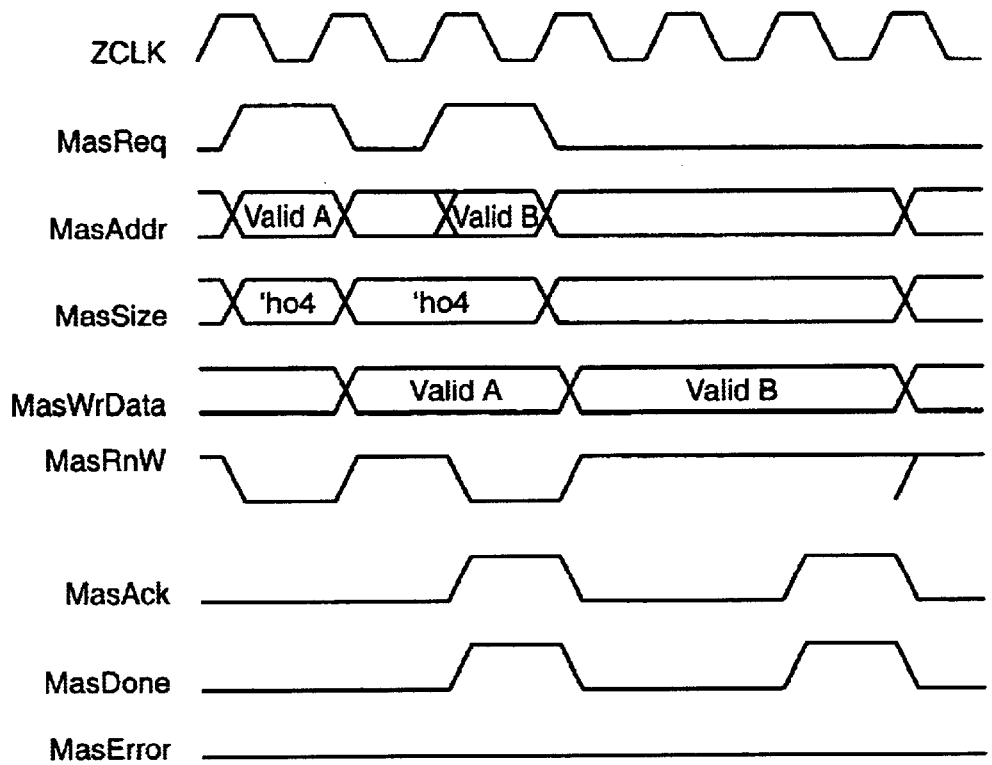
FIG._4

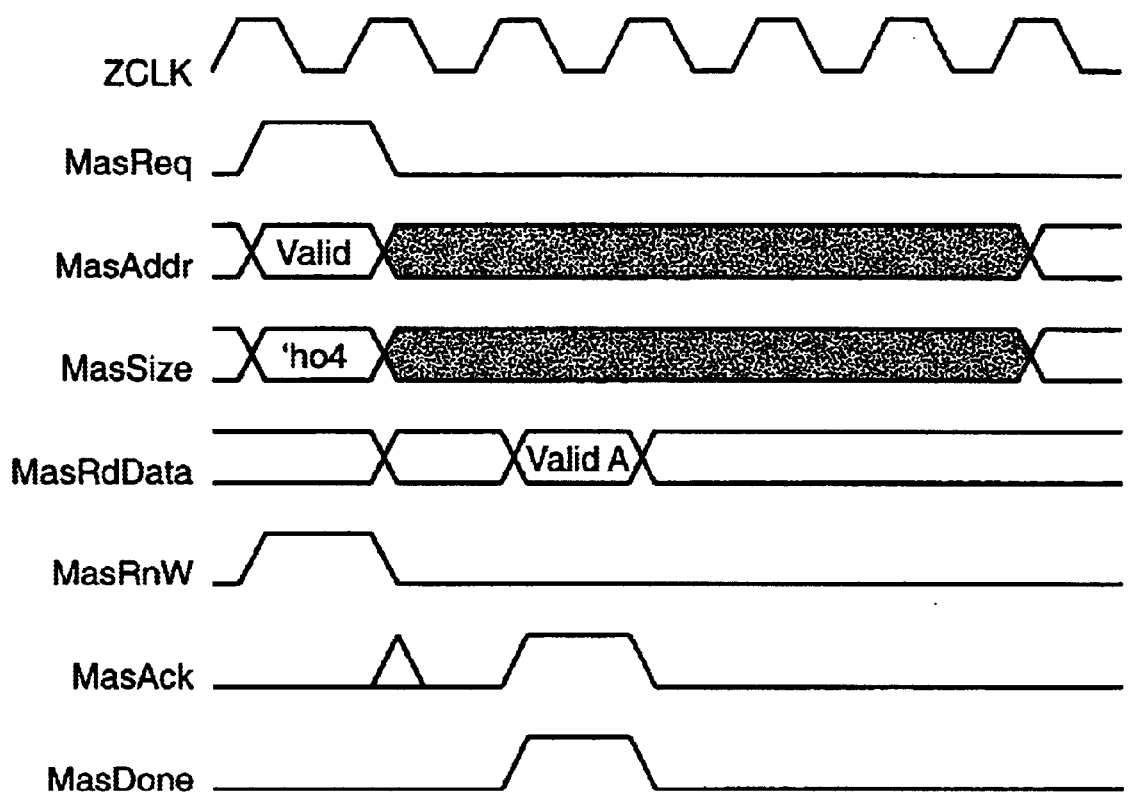
FIG._5
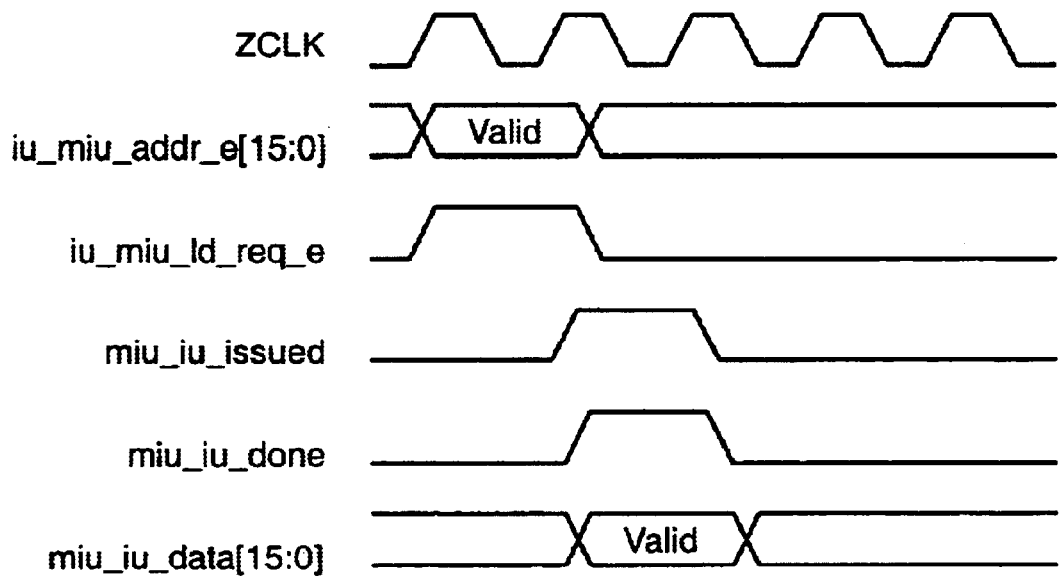
FIG._6

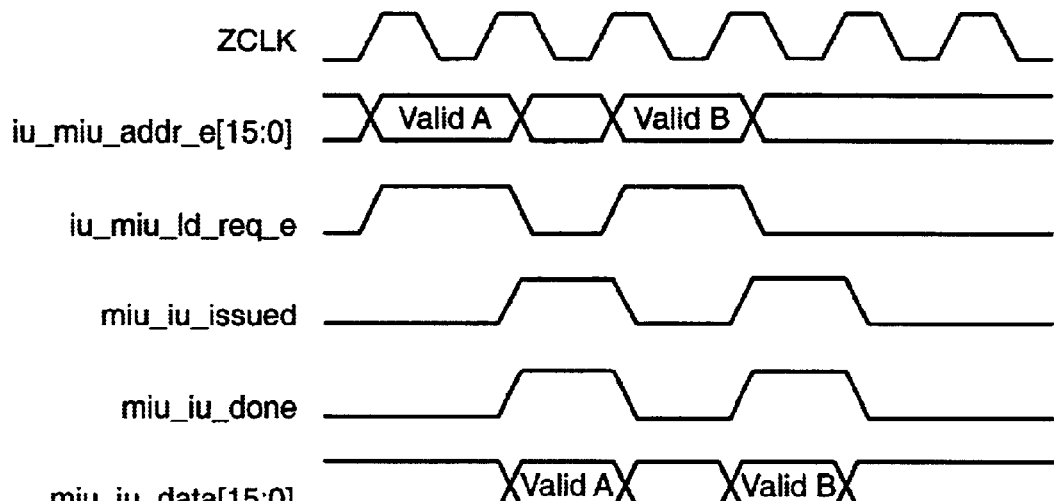
FIG._7
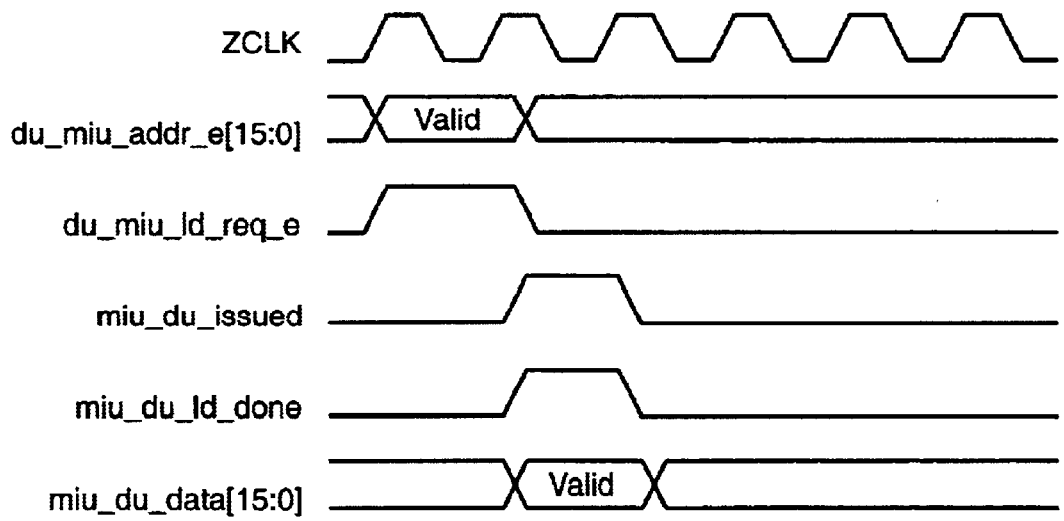
FIG._8

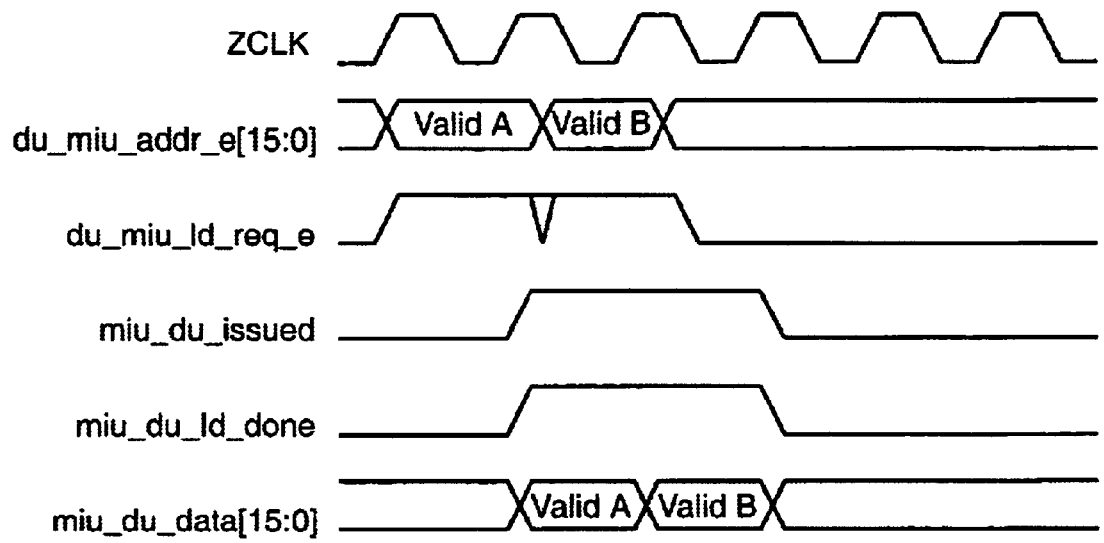
FIG._9
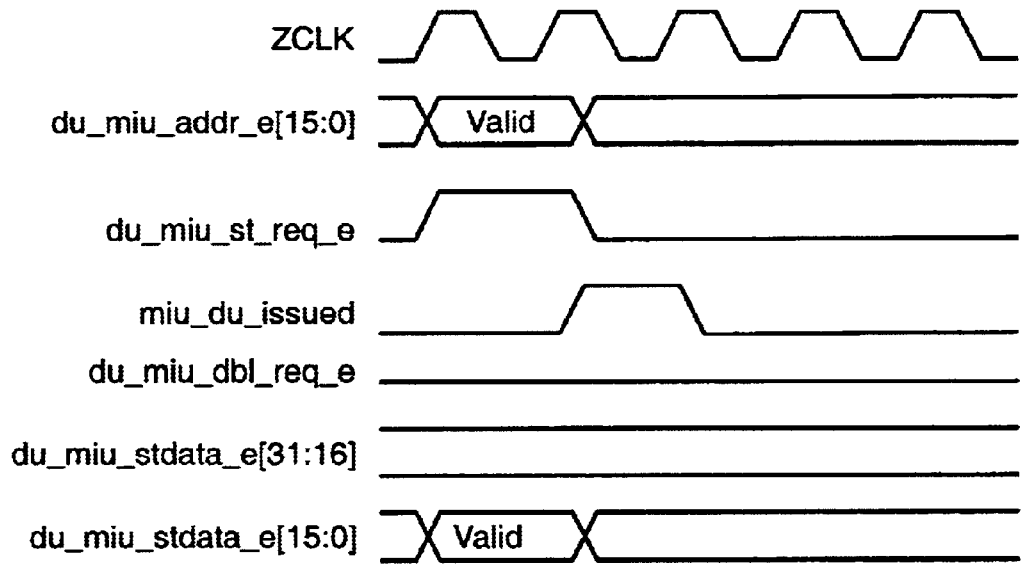
FIG._10

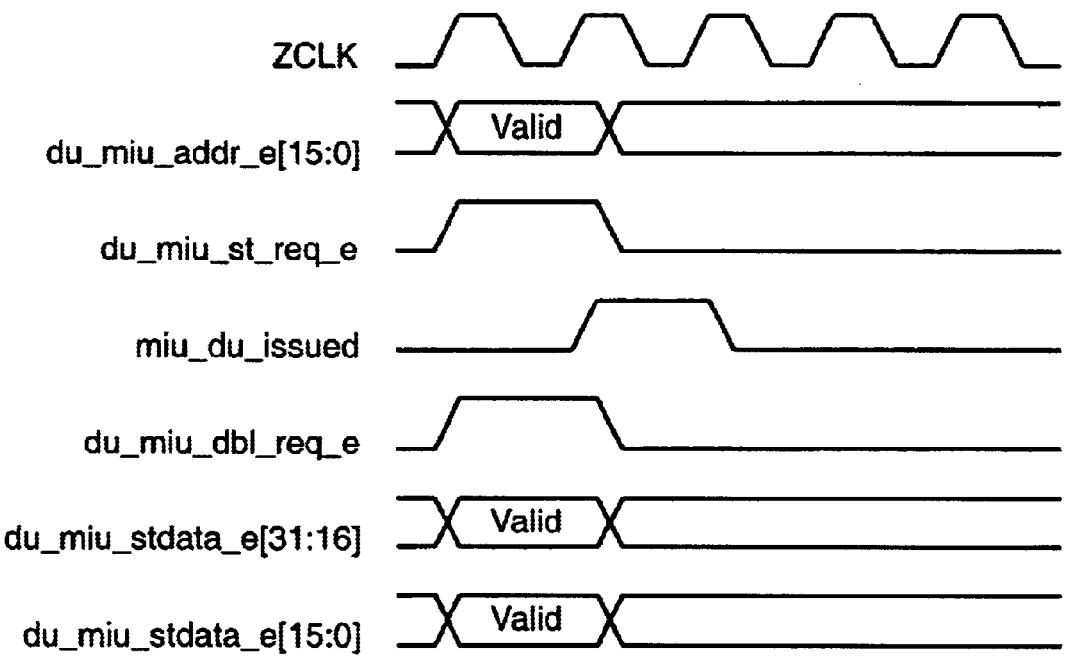
FIG._11
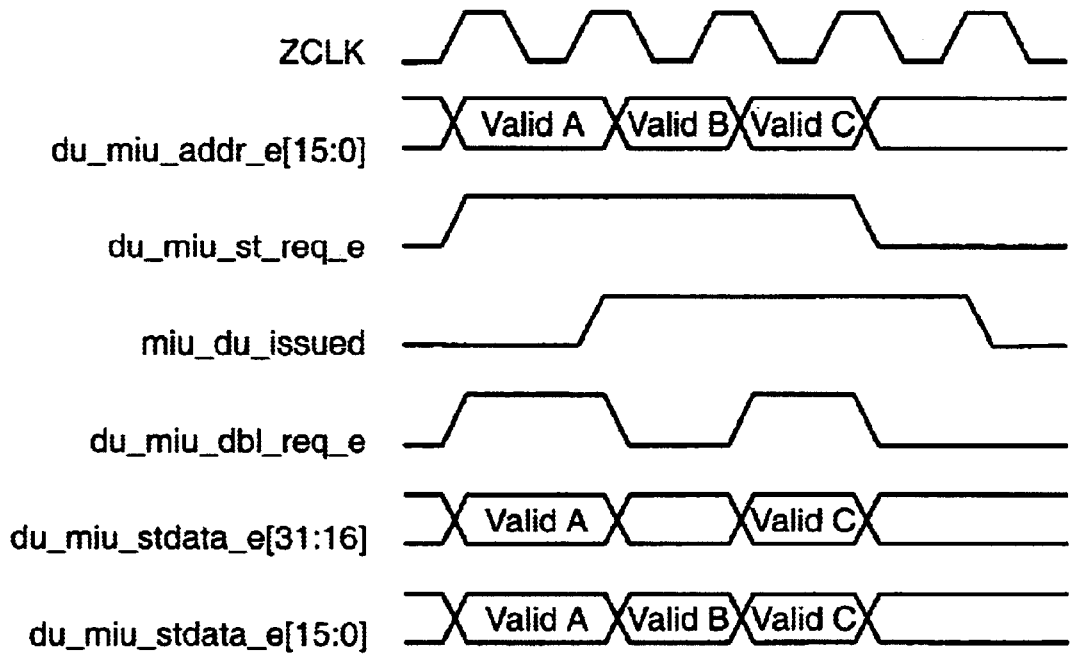
FIG._12

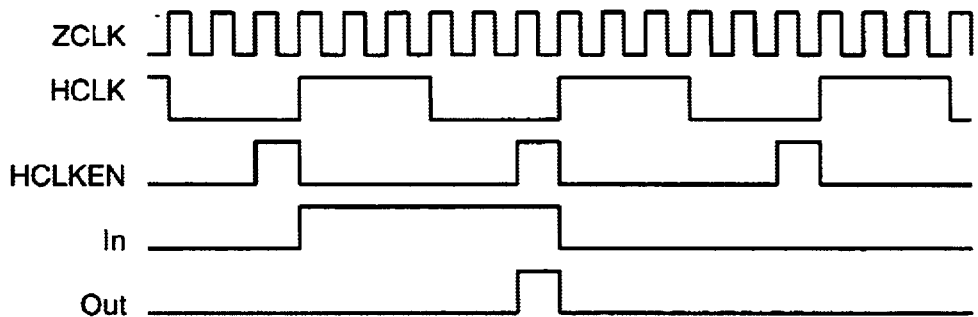
FIG._13
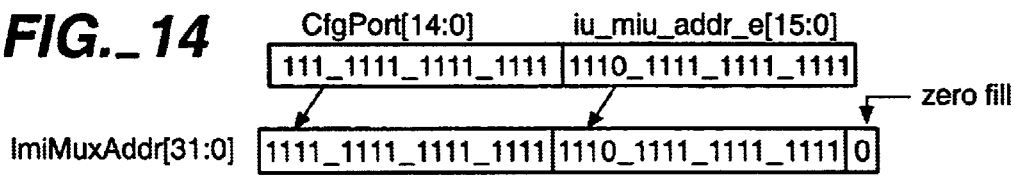
FIG._14
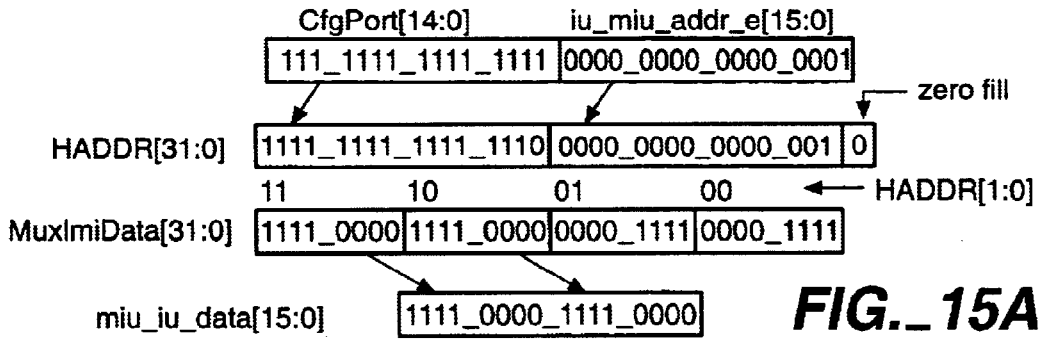
FIG._15A
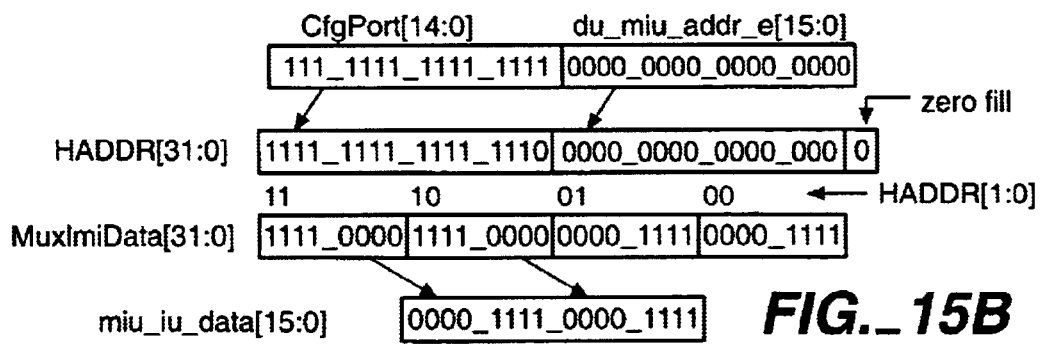
FIG._15B

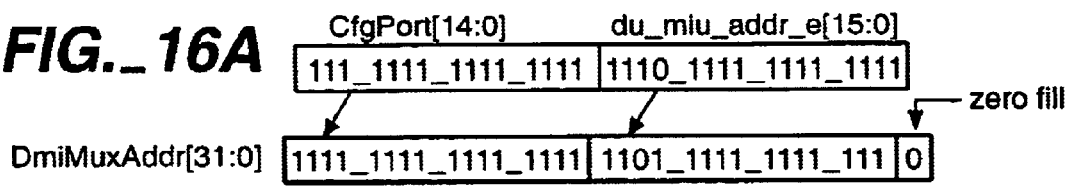
FIG._16A
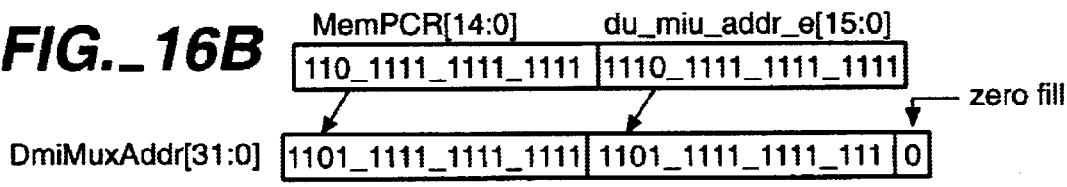
FIG._16B
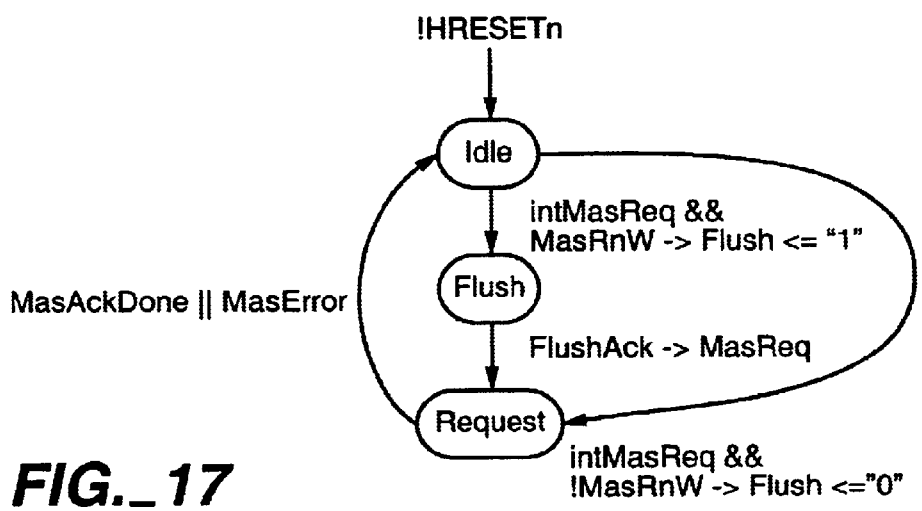
FIG._17

BRIDGE FOR COUPLING DIGITAL SIGNAL PROCESSOR TO ON-CHIP BUS AS MASTER

CROSS-REFERENCE TO RELATED APPLICATIONS

This application claims priority based on provisional patent application Serial No. 60/270,063, filed Feb. 20, 2001.

This application incorporates by reference for all purposes, the following applications, filed on the same date as this application and assigned to the same assignee as the present application:

U.S. patent application Ser. No. 09/847,850, filed Apr. 30, 2001, entitled "Bridge For Coupling Digital Signal Processor to AMBA Bus as Slave" by inventor Charles H. Stewart; and U.S. patent application Ser. No. 09/847,848, filed Apr. 30, 2001, entitled "A Parameterizable Queued Memory Access System" by inventor Charles H. Stewart.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to digital signal processors (DSPs) and more particularly to a bridge for connecting a digital signal processor (DSP) to an on-chip bus (OCB) such as an Advanced Microcontroller Bus Architecture ("AMBA") Advanced High-performance Bus ("AHB").

The device known as the Digital Signal Processor, DSP, is a specialized microprocessor which can process signal streams with complex mathematical formulas in real time. A DSP is typically ten to fifty times more powerful than typical microprocessor devices such as the microprocessor cores used in application specific integrated circuits (ASICs). Applicant's ZSP DSP has an open architecture which allows it to be easily programmed and used for numerous applications.

As complex cores, such as DSPs, are integrated in current and future generation ASICs, leading semiconductor companies are increasingly adopting standardized integration over On-Chip Busses (OCBs). OCB standardization facilitates a host of system on chip issues, including core portability, design reuse, leveraging common peripherals and processors, improving automated verification, and increasing customer capabilities to create products from a common design platform. Many widely used RISC (reduced instruction set computer) and DSP cores have their own complex and unique bus structures that often lack native provisions for straightforward integration with each other and supporting logic. A key need for multi-core systems is for buses to connect together these building blocks in a consistent manner that allows multiple cores to master the bus, rapidly moving large blocks of data and high-speed data transfer. These requirements drive the adoption of OCB standards.

Some additional business drivers for the adoption of OCB standards by semiconductor companies are: facilitating use of high value proprietary cores; reducing barriers to integrating proprietary cores from third party industry sources; providing a freely licensed and non-proprietary system framework and bus structure; reducing risk and engineering effort in system or ASIC integration and communication; minimizing interconnection issues to system companies; and, meeting industry standards for semiconductor vendor independence.

In order to support technical and business OCB requirements, a range of semiconductor companies are adopting the Advanced Microcontroller Bus Architecture (AMBA) for high performance proprietary core integration. AMBA was developed by ARM Inc. in collaboration with its semiconductor partners and put in the public domain to provide a de facto standard for integrating RISC processors to other proprietary cores and peripherals. The Open AMBA standard for a set of system busses for integrating processor and other proprietary cores defines the most widely implemented on-chip bus (OCB) in the industry. The AMBA standard version 2.0 defines three sets of busses, AHB (AMBA High-performance Bus), ASB (AMBA System Bus), and APB (AMBA Peripheral Bus). AHB was developed for on-chip bussing in high bandwidth processor cores.

The AMBA AHB is intended to address the requirements of high-performance synthesizable designs. It is a high-performance system bus that supports multiple bussed cores and provides high-bandwidth operation. The AHB is a single-edge timed, multiplexed data bus controlled by arbitration logic. AHB bus arbitration connects multiple processor and peripheral cores. AHB control signals define arbitration and decoding control of the bus and its interfaces. The AHB controls are not specific to a processor, but are optimized for memory systems. AHB supports block transfers and wider bus controls needed in high-speed high bandwidth systems.

As the applications have become more complex, e.g. multimedia wireless and broadband applications, DSPs have been increasingly used with ASICs to provide the required functionality. However, DSPs generally operate at clock frequencies higher than can be supported by the AMBA AHB and generally use different signal protocols. To realize the benefits of both ASICs and DSP, it would be useful to provide a means for coupling signals, including data and instructions, between the ASIC's on-chip bus, such as the AMBA AHB, and a DSP despite the differing clock frequencies and signal protocols. By providing the DSP with access to the on-chip bus, the DSP would have access to other peripheral devices and large mass storage memories available to the ASIC.

BRIEF SUMMARY OF THE INVENTION

In accordance with the present invention, a bridge is provided between a DSP and an on-chip bus which allows the DSP to operate as a master on the on-chip bus. The bridge includes an instruction unit master interface and a data unit master interface to convert DSP instruction unit and data unit external signals into bus protocol signals. A bridge arbiter is provided to receive the signals from the two interfaces and selectively pass the signals to a generic bus master. A synchronization unit is provided to insure alignment of positive clock transitions between the different clock frequencies of the on-chip bus and the DSP and to buffer signals as needed. The generic bus master couples signals from the bridge arbiter and the synchronization unit to the on-chip bus in compliance with standard signal protocol.

BRIEF DESCRIPTION OF THE DRAWINGS

FIG. 1 is a general block diagram of an embodiment of the present invention including a portion of an ASIC, a DSP and a bridge connecting the DSP to the ASIC as a master;

FIG. 2 is a more detailed block diagram of the bridge listing the signals which pass between the DSP and the ASIC on-chip bus through the bridge;

FIG. 3 is a timing diagram illustrating simple read and write transfers on an AMBA AHB bus;

FIG. 4 is a timing diagram illustrating a write transaction to the generic master and AHB;

FIG. 5 is a timing diagram illustrating a read transaction from the generic master;

FIG. 6 is a timing diagram illustrating a basic instruction unit load or read transaction;

FIG. 7 is a timing diagram illustrating an advanced instruction unit load or read transaction;

FIG. 8 is a timing diagram illustrating a basic data unit load or read transaction;

FIG. 9 is a timing diagram illustrating an advanced data unit load or read transaction;

FIG. 10 is a timing diagram illustrating a basic 16 bit data unit store or write transaction;

FIG. 11 is a timing diagram illustrating a basic 32 bit data unit store or write transaction;

FIG. 12 is a timing diagram illustrating advanced data unit stores or write transactions;

FIG. 13 is a timing diagram for a basic synchronizer;

FIG. 14 is an illustration of 16-bit to 32-bit instruction unit address mapping;

FIGS. 15(a) & 15(b) show the instruction unit data mapping for a load or read request when iu_miu_addr e[0] equals '1' and '0', respectively;

FIGS. 16(a) and 16(b) illustrate 16-bit to 32-bit data unit address mappings when du_miu_ispace_e is asserted and de-asserted respectively; and FIG. 17 is a process flow chart illustrating the flush acknowledge state machine operation.

DETAILED DESCRIPTION OF THE INVENTION

FIG. 1 illustrates the overall structure of a portion of an ASIC 17, a DSP 10 and a bridge 34 connecting the DSP 10 to the ASIC 17 in an embodiment as contemplated by the present invention. The DSP 10 includes a DSP core 12, an instruction unit external interface, IU, 14 and a data unit external interface, DU, 16. The IU 14 and DU 16 each act as a separate master. The IU is used to fetch instructions. The DU is used when accessing external memory or external peripherals to read or write data or instructions. The ASIC 17 includes two slave devices 18, a master device 20, an arbiter 22, a master multiplexor 24, a decoder 26 and a slave multiplexor 28. Signals are coupled between the ASIC devices by a master bus 30 and a slave bus 32, which together form an on-chip bus. In the preferred embodiment the on-chip bus is an AMBA AHB. The term "on-chip bus" as used herein means any type of bus used in an ASIC, such as the AMBA AHB. The term also includes busses which physically extend beyond a single chip, for example onto a printed circuit board on which an ASIC may be mounted or onto a back plane to which such a printed circuit board may be connected.

The master bridge 34 of the present invention includes an IU master interface, Imi, 36, a DU master interface, Dmi, 38, a bridge arbiter, Mux/Arb, 40, a synchronizer, Sync, 42 and a generic AHB master, Hmas, 44. The Hmas module 44 is used to connect to the AHB master bus 30 and slave bus 32 in compliance with AMBA AHB protocol. The master bridge 34 is also referred to in the drawings and the following specification as the ApZmas, which is an acronym for AMBA Peripheral ZSP AHB master module.

In an ASIC operating with the AMBA AHB, masters are connected to the rest of the system in a special way. Since the AHB is a multi-master bus, each master, e.g. 20 and 44, must request ownership of the master bus 30. Once granted ownership by arbiter 22, the master's bus interface signals are routed by master multiplexor 24 and bus 30 to every slave 18. An individual slave is selected out of the set of slaves by the system decoder 26. This system decoder 26 looks at the address provided by the master to determine the proper slave for the access. The decoder 26 drives multiplexor 28 to connect the selected slave to the slave bus 32 which connects slave response signals back to all of the masters. The currently granted master and the selected slave then transfer data.

FIG. 2 shows more detail of the bridge 34 and lists the signals which pass between DSP 10 and the on-chip bus 30, 32 though bridge 34. Table 1 below lists these signals which pass between the bridge 34 and the on-chip bus 30, 32 on one side and the DSP IU 14 and DU 16 on the other side. Table 1 also provides an indication of direction and a description of each signal. It is divided into two clock domains, namely AHB and ZSP. The AHB ports are running at the AMBA AHB clock (HCLK) and the ZSP ports are running at the ZSP system clock (ZCLK). HCLK may be derived from ZCLK, in which case the positive edges between these two clocks must be aligned. A one ZCLK wide pulse marker (HCLKEN) is generated within the clock generator of ASIC 17 to indicate the positive edge alignment. Since the on-chip bus used in the preferred embodiment is the AMBA AHB, the bus signal names all begin with a capital "H" in conformity with the AMBA specification as published by ARM Limited, which specification is hereby incorporated by reference in its entirety and for all purposes.

TABLE 1

| Signal | Dir | Description |
| --- | --- | --- |
| Ports interface to the AHB bus (AHB side) | | |
| HCLK | input | This clock times all bus transfers. It is ZCLK divided by an integer. |
| HCLKEN | input | a ZSP clock period pulse indicates the positive edge marker of the ZSP clock with respect to HCLK. |
| HRESETn | input | This active low signal is used to reset the system and the bus. |
| HADDR[31:0] | output | The master to slave address bus |
| HTRANS[1:0] | output | Indicates the type of the current transfer (idle, busy, nonseq, and seq) |
| HWRITE | output | 1-write, 0-read |

TABLE 1-continued

| Signal | Dir | Description |
| --- | --- | --- |
| HSIZE[2:0] | output | Indicates the size of the transfer (byte 8-bit, half-word 16-bit, word 32-bit. . .) |
| HBURST[2:0] | output | Indicates if the transfer forms part of a burst (single, incr, wrap. . .) |
| HWDATA[31:0] | output | The master to slave data path (write data). This bus is little endian. |
| HBUSREQ | output | The master's bus request signal |
| HGRANT | input | The master's bus grant signal |
| HREADY | input | The HREADY from the last selected slave |
| HRDATA[31:0] | input | The slave to master data path (read data) |
| HRESP[1:0] | input | Additional information about the status of the transfer (okay, error, retry, split) |
| Ports interface to ZSP IU | | |
| iu_miu_Id_req_e | input | IU load request signal |
| iu_miu_addr_e[15:0] | input | IU transfer address |
| Miu_iu_issued | output | indicates the load address request has been captured |
| Miu_iu_done | output | indicates the load request has been served |
| Miu_iu_data[15:0] | output | valid data when miu_iu_done is asserted |
| Ports interface to ZSP DU | | |
| du_miu_Id_req_e | input | DU load request signal |
| du_miu_st_req_e | input | DU store request signal |
| du_miu_dbl_req_e | input | '0' -- single store (16-bit); '1' -- double store (32-bit) |
| du_miu_memmap_e | input | DU is accessing memory mapped register space (only addresses 0xF806 and 0xF807 are writable and 0xF803 through 0xF807 are readable) |
| du_miu_ispace_e | input | when this signal is asserted the CfgPort is selected for the AHB upper address bits. Note that du_miu_memmap_e and du_miu_ispace_e can not be asserted at the same time. |
| du_miu_periph_e | input | DU is accessing peripheral space (ignored) |
| du_miu_addr_e[15:0] | input | 16-bit DU address |
| du_miu_stdata_e[31:0] | input | 32-bit DU store data (write) |
| Miu_du_issued | output | indicates when load/store request is completed |
| Miu_du_Id_done | output | indicates when the load request is completed |
| Miu_du_data[15:0] | output | 16-bit DU load data (read) and valid when miu_du_Id_done is asserted |
| Miscellaneous Ports | | |
| ZCLK | input | ZSP system clock |
| Nreset | input | The global reset (may connect to HRESETn) |
| Flush | output | tells a slave to flush out its internal buffer |
| FlushAck | input | indicates the slave internal buffer has been flushed |
| CfgPort[14:0] | input | these ports are used to assign the upper address bits of the AHB when IU accessing the bus. They should be grounded if not used. |
| GpoPort[15:0] | output | these ports are designated for general purpose output ports. They may be routed externally to the CfgPort. Default value at reset is zeroes. |
| IuIntr | output | indicates when error occurs on AHB response bus due to IU access. This signal lasts for one clock cycle. |
| DuIntr | output | indicates when error occurs on AHB response bus due to DU access or DU accesses to the memory map location which has not been assigned. This signal lasts for one clock cycle. |

Table 2 provides a listing of signals at the ports of the generic AHB master 44, divided into the signals which are coupled to the on-chip bus 30, 32 and the signals which are coupled to the DSP 10.

TABLE 2

| Signal | Dir | Description |
| --- | --- | --- |
| Ports interface to the AHB bus (AHB side) | | |
| HCLK | Input | This clock times all bus transfers |
| HCLKEN | Input | a ZSP clock period pulse indicates the positive edge marker of the ZSP clock with respect to HCLK. |
| HRESETn | Input | This active low signal is used to reset the system and the bus. |
| HADDR[31:0] | Output | The master to slave address bus |

TABLE 2-continued

| Signal | Dir | Description |
|---|---|---|
| HTRANS[1:0] | Output | Indicates the type of the current transfer (idle, busy, nonseq, and seq) |
| HWRITE | Output | 1-write, 0-read |
| HSIZE[2:0] | Output | Indicates the size of the transfer (byte 8-bit, half-word 16-bit, word 32-bit . . .) |
| HBURST[2:0] | Output | Indicates if the transfer forms part of a burst (single, incr, wrap. . .) |
| HWDATA[31:0] | Output | The master to slave data path (write data). This bus is little endian. |
| HBUSREQ | Output | The master's bus request signal |
| HGRANT | Input | The master's bus grant signal |
| HREADY | Input | The HREADY from the last selected slave |
| HRDATA[31:0] | Input | The slave to master data path (read data) |
| HRESP[1:0] | Input | Additional information about the status of the transfer (okay, error, retry, split) |
| Ports interface to the generic AHB bus (the IU/DU side) | | |
| MasReq | Input | The internal master's request |
| MasRnW | Input | High for reads, low for writes |
| MasSize[4:0] | Input | Transfer size in bytes |
| MasAddr[31:0] | Input | The internal master's address |
| MasWrData[31:0] | Input | The internal master to bus data path |
| MasAck | Output | The internal master's data transfer acknowledge. |
| MasDone | Output | Indicates that all data has been transfered |
| MasError | Output | Indicates when error occurs on AHB response bus (HRESP = 01) |
| MasRdData[31:0] | Output | The bus to internal master data path |

In FIG. 2 a ZSP Master Interface Gasket (Zmig) module 46 connects the IU 14 and DU 16 masters to the generic master module 44 via the bridge arbiter 40. The Zmig comprises the Imi 36, the Dmi 38, the MuxArb 40 and registers 48, 50, 52, 54 and 56. Table 3 provides a listing of the signals passing between the Zmig module.46 and, on one side, the generic AHB master 44 and, on the other side, the IU 14 and the DU 16.

TABLE 3

| Signal | Dir | Description |
|---|---|---|
| Ports interface to the Generic AHB Master (Hmas) | | |
| MasReq | output | The selected master's request |
| MasRnW | output | High for reads, low for writes |
| MasSize[4:0] | output | Transfer size in bytes |
| MasAddr[31:0] | output | The selected master's address |
| MasWrData[31:0] | output | The internal master to AHB bus data path |
| ZCLK | input | ZSP system clock |
| MasAck | input | The selected master's data transfer acknowledge. |
| MasDone | input | Indicates that all data has been transfered |
| MasError | input | Indicates when error occurs on AHB response bus (HRESP = 01) |
| MasRdData[31:0] | input | AHB bus data path to internal master |
| Ports interface to AHB Slave | | |
| Flush | output | tells the slave to flush out its internal buffer |
| FlushAck | input | indicates the slave internal buffer has been flushed |
| Ports interface to the ZSP IU/DU External ports | | |
| iu_miu_Id_req_e | input | IU load request signal |
| iu_miu_addr_e[15:0] | input | IU transfer address |
| miu_iu_issued | output | Zmig has completed the address phase of a read transfer. |
| miu_iu_done | output | Zmig has completed the data phase of the load. |
| miu_iu_data[15:0] | output | Zmig to IU data path |
| Nreset | input | The global reset (may connect to HRESETn) |
| du_miu_Id_req_e | input | DU load request signal |
| du_miu_st_req_e | input | DU store request signal |
| du_miu_dbl_req_e | input | DU is storing 32 bits |
| du_miu_memmap_e | input | DU is accessing memory mapped register space (only addresses 0xF806 and 0xF807 are writable, addresses 0xF803 through 0xF807 are readable) |
| du_miu_ispace_e | input | DU is accessing instruction space |

TABLE 3-continued

| Signal | Dir | Description |
| --- | --- | --- |
| du_miu_periph_e | input | DU is accessing peripheral space (ignored) |
| du_miu_addr_e[15:0] | input | DU transfer address |
| du_miu_stdata_e[31:0] | input | DU to internal Zmig bus data |
| miu_du_issued | output | Zmig has completed the address phase of a read transfer, or the write transfer has completed. |
| miu_du_Id_done | output | Zmig has completed the data phase of the load. |
| miu_du_data[15:0] | output | Zmig to DU data path |
| Miscellaneous Ports | | |
| CfgPort[14:0] | input | these ports are used to assigned the upper address bits of the AHB when IU accessing the bus. They should be grounded if not used. |
| GpoPort[15:0] | output | these ports are designated for general purpose output ports. They may be routed externally to he CfgPort. Default value at reset is zeroes. |
| IuIntr | output | indicates when error occurs on AHB response bus due to IU access. This signal lasts for one clock cycle. |
| DuIntr | output | indicates when error occurs on AHB response bus due to DU access or DU accesses to the memory map location which has not been assigned. This signal last for one clock cycle. |

The signals from Imi 36 and Dmi 38, through MuxArb 40 to Hmas 44 comprise a bridge bus having a protocol similar to the AMBA AHB protocol. The Imi 36 and Dmi 38 translate the signals at the ports of IU 14 and DU 16 from the DSP 10 protocol into this bridge bus protocol. The Hmas 44 translates the bridge bus signals into the on-chip bus 30, 32 protocol, in this case, the AMBA AHB protocol. The bridge bus signals are related to each other and to the AHB signals as follows. MasReq is the same as ImiMuxReq or DmiMuxReq, as selected by MuxArb 40, and is used by Hmas 44 to produce the HBUSREQ signal. MasRnW is the same as ImiMuxRnW or DmiMuxRnW and is used to produce the HWRITE signal. MasSize[4:0] is the same as ImiMuxSize[4:0] or DmiMuxSize[4:0] and is used to produce HSIZE[2:0]. MasAddr[31:0] is the same as ImiMuxAddr[31:0] or DmiMuxAddr[31:0] and is used to produce HADDR[31:0]. MasWrData[31:0] is the same as DmiMuxData[31:0] (the IU 14 does not write) and is used to produce HWDATA[31:0]. MasRdData[31:0] is the same as HRDATA[31:0] and is used to produce MuxImiData[31:0] or MuxDmiData[31:0]. MasError is generated from HRESP (when it equals 01) and is used to produce MuxImiError or MuxDmiError. MasDone and MasACK are generated from HREADY and HRESP and are used to produce MuxImiDone or MuxDmiDone.

The bridge 34 is used to communicate with the AHB slaves 18. An AHB transfer consists of two distinct phases, the address phase and the data phase. The address phase lasts only a single cycle, while the data phase may require several cycles. A multicycle data phase is achieved using the HREADY signal from the selected slave. In general, the AHB master drives the address and control signals onto the bus 30 after the rising edge of HCLK. The slave then samples the address and control information on the next rising edge of HCLK. After the slave has sampled the address and control information, it can start to drive the appropriate response and this is sampled by the AHB master when HREADY is asserted. In fact, the address phase of any transfer occurs during the data phase of the previous transfer.

FIG. 3 shows a simple transfer example of an AHB Master, assuming the AHB Master has been granted ownership of master bus. This example demonstrates a portion of the standard AMBA protocol. In this example, there are two reads and two writes driven by the AHB master, e.g. Hmas 44. After the rising edge of HCLK 1, the master drives the "A" address, HADDR, and read controls, Control, onto the bus. This is called the address phase. On the next rising edge of the HCLK 2, the slave samples the address and control. At this time, the slave is ready to send data by asserting the HREADY high along with the HRDATA "Data A". This is called the data phase. While HREADY is asserted, the master drives the "B" address and write controls onto the bus. On HCLK 3, the master samples the read data "Data A" while driving the HWDATA "Data B". At this time, the slave is ready to accept data by asserting the HREADY high, allowing the master to drive the "C" address and read controls onto the bus. On HCLK 4, the slave is not ready to send the read data and therefore deasserts HREADY. This is called the wait state or extended cycle. On HCLK 5, the slave is ready and it drives the HRDATA "Data C" and asserts HREADY. Simultaneously, the slave receives the master's address "D". On HCLK 6, the master samples the previous read "Data C" while asserting the write "Data D". At this time, the slave indicates that it is not ready to accept data by de-asserting the HREADY for one cycle. The master must hold the data stable until the slave asserts HREADY. On HCLK 8, the slave samples the write "Data D" while the master pulls away the HWDATA and a new request may be asserted. In the case of a read transfer the slave does not have to provide valid data until the transfer is about to complete.

With reference to FIG. 2, the bridge bus connecting signals between the AHB Hmas 44 and ZSP Zmig 46 can be described as a translator which translates between two different master interfaces. This bus contains several signals. Once Zmig has a valid request, it drives the request signal, MasReq, the transaction starting address, MasAddr[31:0], the transaction direction, MasRnW, and the transaction byte count, MasSize[4:0]. The Zmig maintains its signals until the transfer is finished. A transfer will finish the clock after MasDone is driven high. MasRnW is high for a read and low for a write. Following the clock after MasReq for a write, the Zmig must drive the write data on MasWrData[31:0]. This data is little endian, and must be properly aligned with respect to the starting address. The Zmig must continue to drive the data until MasAck is asserted. When the transfer is finished, the Hmas block will drive MasDone coincident with the last MasAck and a new transfer may be started.

FIG. 4 shows an example write to Hmas 44 on the bridge bus. The, data "A" on MasWrData[31:0] is asserted by the Zmig 46 on the clock following the MasReq and held until the MasAck is asserted by the Hmas 44. Data "B", the last write data, is also asserted and held until the MasAck is asserted. Since this is the last data, the Hmas 44 asserts the MasDone as well, indicating the transfer is completed.

As illustrated in FIG. 5, read transfers occur in essentially the same manner on the bridge bus. Read data is returned to the Zmig on MasRdData[31:0]. This data bus is little endian. Valid data is qualified with the MasAck and MasDone signal. If the bus slave responds to the transfer with an "error" response (HRESP=01), then the AHB master drives the MasError signal. Data transferred while MasError is high is not guaranteed to be valid. In FIG. 5, the Zmig asserts a MasReq control and address to the Hmas with the size of 4 bytes. Later, the AHB master responds with the MasAck, indicating the data word on MasRdData[31:0] is valid. It also asserts the MasDone, indicating the end of transfer.

FIG. 6 and FIG. 7 depict the basic and advanced IU 14 load instructions, respectively. Several signals make up the DSP 10 external interfaces. The IU interface 14, since it is only used for instruction fetches, only has load (or read) based signals. The DU 16 interface has more features since it is used for both load and store (or write) accesses.

The IU external interface has five signals. The signal iu_miu_addr_e[15:0] contains the instruction fetch address. On loads, this address is qualified with iu_miu_ld_req_e. Once asserted, iu_iu_ld_req_e and iu_miu_addr_e[15:0] remain asserted until miu_iu_issued is high. The signal miu_iu_issued ends the access, and another address may be asserted. The signal miu_iu_done is used to qualify the read data. It is asserted after the positive edge of the clock along with the read data on miu_iu_data[15:0]. Both miu_iu_issued and miu_iu_done may be asserted at the same time.

FIG. 8 and FIG. 9 depict the basic and advanced data load instructions, respectively. The DU interface 16 has several interface signals. The load request and acknowledge signals are similar to the IU load request signals. du_miu_addr_e[15:0] contains the load/store address. On loads, this address is qualified with du_miu_ld_req_e. Once asserted, du_miu_ld_req_e and du_miu_addr_e [15:0] remain asserted until miu_du_issued is high. The signal miu_du_issued ends the access, and another address may be asserted to begin a new access. The signal miu_du_ld_done is used to qualify the read data. It is asserted by the Hmas 44 after the positive edge of the clock along with the read data on miu_du data[15:0]. Both miu_du_issued and miu_du_ld_done may be asserted at the same time.

FIGS. 10 through 12 depict the 16 and 32-bit store or write protocols. The write request signals do not have a data acknowledge. The core 12 asserts du_miu_addr_e[15:0], du_miu_st_req_e, du_miu_stdata_e, and du_miu_dbl_req_e (if necessary). The core will hold these signals asserted until the Hmas 44 sets miu_du_issued high. The signal miu_du_issued ends the access, and another address may be asserted to begin a new access. If a double store occurs, du_miu_dbl_req_e is asserted to qualify du_miu_stdata_e[31:16].

There are several signals that are asserted with du_miu_ld_req_e and du_miu_st_req_e that control the memory destination of the access. When du_miu_ispace_e is asserted with a valid transaction, the access is intended for instruction space. The signal du_miu_memmap_e is asserted when the memory mapped registers are the destination space. The signal du_miu_periph_e is asserted when the peripheral space is accessed. Due to the requirement of the AHB-ZSP, du_miu_periph_e is ignored.

With reference to FIG. 1, the ApZmas module 34 is designed to translate the communication between two different boundary protocols, namely, the DSP IU/DU external interfaces 14, 16 and the AMBA AHB bus 30, 32. Signals between the two interface boundaries are sampled by the Synchronizer (Sync) 42. The DSP bus is a 16-bit interface, but the DU data may, at times, occur in 32-bit for double store. The AMBA AHB bus is always 32-bit. As shown in FIG. 2, the ApZmas 34 architecture consists of two main modules, partially connected through the Sync block 42; the AHB master (Hmas) 44 and the DSP master interface gasket (Zmig) 46. The Sync 42 is needed to synchronize signals between the two interfaces. The Zmig 46 is organized with three sub-modules: the IU master interface (Imi) 36, the DU master interface (Dmi) 38, and the Multiplexer/Arbitor (MuxArb) unit 40.

As illustrated in FIG. 1, a clock boundary 43 exists between the DSP 10 and the AHB 30, 32. The DSP 10 usually operates at a higher clock frequency than the AHB. With reference to FIG. 2, the boundary lies between the bridge arbiter 40 of Zmig 46 and the generic AHB master 44. The signals which pass from the MuxArb 40 to the Hmas 44 do not need to be synchronized to the AHB clock. These signals are kept constant until the acknowledge signal from the Hmas 44 is asserted.

Since the AHB bus clock may operate at a slower frequency than the ZSP clock, signals from the AHB clock must be synchronized down to the ZSP clock. These signals include the MasAck, MasDone, and MasError. Other signals such as MasRdData do not need to go through the Sync 42 since they are held constant until MasAck is deasserted.

FIG. 13 shows the timing diagram of the Synchronizer when HCLK equals the ZCLK divided by 6. HCLKEN is generated periodically with the pulse width equal to one cycle of ZCLK. The falling edge of HCLKEN is aligned with the rising edge of HCLK. This signal indicates the alignment of the positive edges between clocks. When both clocks are running at the same frequency, HCLKEN must be set to a logic '1'. Input signal "In" is synchronized to a single ZCLK pulse "Out" when HCLKEN is high.

With reference to FIG. 1, the purpose of the Imi sub-module 36 is to map the 16-bit ZSP IU external interface 14 to the 32-bit AMBA AHB bus interface. It is a load (read) access only. Therefore, the request to the AHB master Hmas 44 is always a read request. Thus, in FIG. 2, the ImiMuxReq and ImiMuxRnW signal passing from Imi 36 to MuxArb 40 are simply the iu_miu_ld_req_e signal. In order for the load request to be serviced, the request is captured and held until miu_iu_done signal is asserted. Note that miu_iu_issued shall always be generated on the next cycle after the iu_miu_ld_req_e is asserted.

FIG. 14 illustrates mapping of the iu_miu_addr_e[15:0] to ImiMuxAddr[31:0]. The upper 15-bits of ImiMuxAddr [31:17] come from the Configuration Port (CfgPort). The next 16-bits of ImiMuxAddr[16:1] is mapped directly to the 16-bit iu_miu_addr_e[15:0]. Bit ImiMuxAddr[0] is forced to zero. As shown in FIG. 14, if the IU address is 16'hEFFF and CfgPort is set to 15'h7FFF, then the 32-bit address bus becomes 32'hFFFF_DFFE.

FIGS. 15a & 15b illustrate how the Imi 36 maps from the AHB 32 bit data to the DSP 16 bit data. With reference to FIG. 2, the 16-bit miu_iu_data[15:0] resulting from the load access must be selected appropriately from the 32-bit AMBA databus. This selection is based on the least significant bit of the IU address (iu_miu_addr_e[0]). If this bit is a '1' the upper 16-bit portion MuxImiData[31:16] is selected. Otherwise, the lower 16-bit data portion MuxImiData[15:0] is selected. FIGS. 15a & 15b show the IU data mapping for load request when iu_miu_addr_e[0] equals '1' and '0', respectively.

With reference to FIG. 2, the size of each IU load access ImiMuxSize[4:0] is always two bytes (1 byte equals 8 bits). The miu_iu_issued signal is always asserted a clock cycle following miu_iu_ld_req_e. Whereas, miu_iu_done is generated based on the MuxImiDone signal. When IU 14 accesses to an invalid destination or when the AHB master 44 encounters an error response from the selected slave due to an IU 14 request, an IuIntr signal is generated coincident with the miu_iu_done signals for one clock cycle. This signal should be routed to the ZSP 10 interrupt controller. When IuIntr is asserted, the corresponding ie bit (see Table 5 below) in the DISR register 48 shall be set and remain set until a read is applied to DISR register 48. At the same time, the corresponding address shall be stored in the IEAR register 50. Similarly, this register will hold the address until a read request is applied. Note that DISR 48 and IEAR 50 registers may only be accessed via the DU 16 load request.

The purpose of the DU master interface (Dmi) 38 in FIGS. 1 and 2 is similar to the Imi sub-module 36 as far as address and data mappings are concerned. The Dmi 38 not only serves the DU 16 load access, it also allows DU 16 store access as well. The internal memory mapped registers are implemented in this module. The DU 16 load access (read) is similar in function to the IU 14 load access, whereas the DU 16 store access (write) must handle both 16-bit and 32-bit stores. In addition, the DU 16 load/store access may be to the instruction space or memory map space depending on the assertion of the signals du_miu_ispace_e or du_miu_memmap_e, respectively. Note that both signals are not permitted to assert at the same time.

The request DmiMuxReq from Dmi 38 to the AMBA AHB bus is asserted when there is a load/store (du_miu_ld_req_e or du_miu_st_req_e) request by the DU 16 with the du_miu_memmap_e is being de-asserted. If this signal is asserted, the request will not be forwarded to the AMBA bus. Instead, the request will be treated as discussed in the subsequent paragraphs.

When du_miu_memmap_e is asserted along with its request (load/store), the only two addresses recognized by the Dmi 38 for load/store requests are at 16'hF806 and 16'hF807. Addresses 16'hF803 through 16'hF805 are load only registers. Table 4 shows the address assignment and the type of each register. All other addresses shall be ignored and in addition to the assertion of the miu_du_issued and miu_du_ld_done, the interrupt to the DU 16 shall be generated coincidently to these signals for one clock cycle, namely DuIntr.

TABLE 4

| Du_miu_addr_e | Type | Size | Name | Comments |
|---|---|---|---|---|
| 16'hF807 | R/W | 15-bit | MemPCR | Memory Page Control Register |
| 16'hF806 | R/W | 16-bit | GPOR | General Purpose Output Register |
| 16'hF805 | R | 16-bit | DISR | IU/DU Status Register |
| 16'hF804 | R | 16-bit | IEAR | IU Error Address Register |
| 16'hF803 | R | 16-bit | DEAR | DU Error Address Register |

The MemPCR register 54 of FIG. 2 is a 15-bit read/write register which is used to store the upper memory map address bits of the AMBA AHB 32-bit bus. It is selected when the miu_du_addr_e equals 16'hF807 for single load/store or double store. Note that DU 16 interrupt is asserted if the double store address equals 16'hF807. When this happens, the Dmi module 38 will store this address in the DEAR register 52 and set the de bit in the DISR register 48 (see Table 5, below). Default value at reset is zeroes.

The GPOR 56 is a 16-bit read/write register which is used for general purpose output applications. It is selected when the miu_du_addr_e equals 16'hF806 for single load/store or double store. The contents of this register are ported to the CfgPort of the ApZmas module 34. Note that DU 16 interrupt is asserted if the double store address equals 16'hF805. Again, when this happens the Dmi module 38 will store this address in the DEAR register 52 and set the de bit in the DISR register 48 (Table 5). Default value at reset is zeroes.

The DISR 48 is a 16-bit read only register which reports the current DUIIU access when there is an error encountered on the AHB bus. For DU 16 internal memory mapped register access, it reports the DU 16 access error if,the current address is an invalid address. Once it is asserted, it remains asserted until a read is applied to this register. For address and error bit correlation purposes, the respective IEAR 50 or DEAR 52 register must be accessed following a read to this register so that they can be tagged to the correct error status bits when the next error is reported. Table 5 shows the bit assignments for reporting access errors. Default value at reset is zeroes.

TABLE 5

| Name | Bit | Comment |
|---|---|---|
| de | 1:0 | DU error -- these bits are set when the DuIntr pin is asserted which indicates that the current DU access has an error resulting either from the AHB bus interface or an invalid address is asserted along with the du_miu_memmap_e signal. At the same time, the corresponding DU address shall be stored in the DEAR register. A read to this register shall clear these bits. The followings list the types of error on the DU interface:<br>"00"-- no error<br>"01"-- indicates single load request error<br>"10"-- indicates single store request error<br>"11"-- indicates double store request error |
| ie | 8 | IU error -- this bit is set when the IuIntr pin is asserted which indicates that the current IU access has an error resulting from the AHB bus interface. At the same time, the corresponding IU address shall be stored in the IEAR register. A read to this register shall clear this bit. |
| res | 15-9, 7-2 | reserved bits. |

The IEAR 50 is a 16-bit read only register which stores the current IU 14 address when an error occurs on the AHB bus corresponding to the ie bit in the DISR 48 register. Once it is set it can only be cleared by reading to this register. Default value at reset is zeroes.

The DEAR 52 is a 16-bit read only register which stores the current DU 16 address when there is an error on the AHB bus or when accessing an invalid memory mapped address. The corresponding de bits in the DISR 48 register are also set when this occurs. Once these bits are set it can only be cleared by reading to this register. Default value at reset is zeroes.

FIGS. 16a and 16b illustrate the mapping in Dmi 38 of the 16-bit du_miu_addr_e[15:0] address to the 32-bit DmiMuxAddr. The Configuration Port (CfgPort) signal is routed to the upper 15-bit portion of the DmiMuxAddr

[31:17] when du_miu_ispace_e is asserted. Otherwise, the 15-bit MemPCR 54 register is selected. The next lower 16-bit portion of DmiMuxAddr[16:1] is mapped directly to the 16-bit DU interface address, and the least significant bit DmiMuxAddr[0] is forced to zero. For example, assume that the DU 16 address is 16'hEFFF and CfgPort is set to 15'h7FFF and MemPCR is set to 15'h6FFF, then if the du_miu_ispace_e is asserted the 32-bit address bus becomes 32'hFFFF_DFFE. However, if the du_miu_ispace_e is deasserted, then the address bus becomes 32'hDFFF_DFFE. This is shown in FIGS. 16a and 16b respectively.

With reference to FIGS. 1 and 2, when the DU 16 requests a data load or read, the 16 bit data miu_du_data[15:0] may be selected from the AHB 32 bit data, MuxDmiData[31:0], which is provided by MuxArb 40 or may be read from one of the registers 48, 50, 52, 54, or 56. If the address is one of the internal memory addresses while the du_miu_memmap_e is asserted, then the read data is coming from the respective assigned register. Any other addresses shall result in an invalid data and an interrupt shall be generated. If the du_miu_memmap_e is de-asserted, the 16-bit data resulting from the load access must be selected from the 32-bit AMBA databus. This selection is based on the least significant bit of the DU 16 address (du_miu_addr_e[0]). If this bit is a '1' the upper 16-bit portion MuxDmiData [31:16] is selected. Otherwise, the lower 16-bit portion MuxDmiData[15:0] is selected.

It takes a different approach for treating a DU 16 store access (write). When du_miu_memmap_e is asserted and the memory map address is hit, only 16'hF806 or 16'hF807 is valid for write access, the following actions shall be taken. If the access is a single store (16-bit) and the du_miu_addr_e is 16'hF806, then the lower 16-bit du_miu_stdata_e[15:0] is written to the GPOR 56, or if the du_miu_addr_e is 16'hF807, then the lower 15-bit du_miu_stdata_e[14:0] is written to the MemPCR 54. If the access is a double store (32-bit) and the du_miu_addr_e is 16'hF805, then the upper 16-bit du_miu_stdata_e[31:16] is written to the GPOR 56 and DU 16 interrupt shall be asserted at address 16'hF805, (because address 16'hF805 is a read only register) or if the du_miu_addr_e is 16'hF806, then the lower 16-bit du_miu_stdata_e[15:0] is written to the GPOR 56 and the next upper 15-bit du_miu_stdata_e [30:16] is written to the MemPCR 54, or if the du_miu_addr_e is 16'hF807, then lower 15-bit du_miu_stdata_e [14:0] is written to the MemPCR 54. The DuIntr is generated in addition to the miu_du_issued, indicating address 16'hF808 is an invalid address.

When du_miu_memmap_e is de-asserted with a valid store request, the request shall be forwarded to the AMBA AHB bus accordingly as follows. If the access is a single store (16-bit) then the lower 16-bit du_miu_stdata_e[15:0] is routed to both upper and lower 16-bit portions of the AHB databus. If the access is a double store (32-bit) and if du_miu_addr_e[0] is zero, all 32-bit is routed to the AHB databus, or if du_miu_addr_e[0] is one, then the lower and upper portions of data is swapped. That is, the lower 16-bit du_miu_stdata_e[15:0] is routed to the upper 16-bit portion of the AHB databus and the upper 16-bit du_miu_stdata_e[31:16] is routed to the lower 16-bit portion of the AHB databus.

The transaction size DmiMuxSize[4:0] of each load access is always two bytes (8-bit/byte) and the size of each store access depends on whether if it is a single or double store. For a single store, the transaction size is two bytes. For a double store, the transaction size is four bytes.

The miu_du_issued and miu_du_ld_done are always asserted at the same time for a load access. For a store access, only the miu_du_issued is asserted. These signals are generated when the transaction is completed (MuxDmiDone).

The DuIntr signal is similar in function to the IuIntr. Furthermore, it also indicates when an invalid memory map address is requested (any address other than 16'hF803 through 16'hF807 for load request and 16'hF806 through 16'hF807 for store request).

With reference to FIGS. 1 and 2, the bridge arbitor (MuxArb) 40 is responsible for prioritizing and selecting the corresponding controls, address, and data with respect to the current related request. For this design, it only needs to serve two sub-masters which are the Imi 36 and Dmi 38. If an additional sub-master is added, a more sophisticated state machine would be required. The priority access algorithm for the embodiment described herein is based on the DSP Core 12. For instance, if all requests are asserted at the same time, the DU 16 load request has the top priority, the IU 14 load request has the next priority, and the DU 16 store request has the last priority. Once the request is accepted, any other request is ignored until the previous request is serviced.

The negation of the IU 14 and DU 16 bus protocol with respect to the _issued and _done signals is designed by means of edge trigger. That is, the request is instantly de-asserted when _issued or _done is asserted. As a result, there might be a problem when there is a momentary glitch on the _issued or _done due to the combinational logic delays from the Hmas 44. The cheapest solution for preventing this occurrence is to register the _issued and _done signals when the transaction is completed. This will cause the transaction pipeline to have an additional cycle, yet it prevents the IU/DU protocols from being un-intentionally negated. To be consistent with the additional cycle on the _issued and _done signals, the data resulting from a load access must also be delayed. Due to the AMBA bus protocol, the data from the DU 16 store access must be aligned with the AMBA data phase. Therefore, when there is a DU 16 store access the data is captured on the next rising edge of the clock and held stable until the transaction is finished.

In the preferred embodiment, the AHB slaves 18, FIG. 1, have internal buffers on their data ports to speed system operation. Other masters perform read and write operations with the same slaves. The following process is provided to be sure that data read and write requests from the Hmas 44 do not conflict with reads and writes from other masters. When there is a request to the Hmas 44 resulting from a DU 16 or IU 14 load/store request, this request is modified to prevent data coherency problems within the slave internal buffer. A state machine is added to serve this function as shown in FIG. 17. Coming out of reset, if there is a read request the state changes to "Flush" state, waiting for "FlushAck" to issue. The request to the Hmas 44 remains deasserted. When "FlushAck" is asserted after the internal buffer is emptied, the state machine switches to the "Request" state and the request is forwarded to the Hmas 44 until the Hmas responds with _Done or _Error signal. In the case of a write request, the state machine bypasses the "Flush" state into the "Request" state and the process is repeated as described above.

The bridge 34 may be implemented on a separate chip. The bridge 34, the DSP 10 and an ASIC may then be interconnected by mounting on a single printed circuit board or on multiple boards connected to a backplane. This would offer maximum flexibility in terms of matching DSPs to ASICs for a particular application.

Alternatively the bridge 34 may be implemented on a chip containing the DSP 10. Since the bridge provides its outputs in the AMBA AHB protocol and that protocol is becoming a standard for ASICs, it makes the DSP compatible with many available ASICs. In this case the DSP plus bridge chip can be connected to an ASIC by a printed circuit board.

Alternatively the bridge 34 may be implemented on a chip with an ASIC or on a chip with the DSP 10 and an ASIC. A fully integrated bridge plus DSP plus ASIC should provide cost and size advantages for large volume applications such as cellular telephones with internet functions.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. Apparatus for connecting a digital signal processor to an application specific integrated circuit on-chip bus as a master comprising:
    a bridge for coupling signals between master ports of a digital signal processor and an application specific integrated circuit on-chip bus, said bridge comprising:
        a master interface having first master interface ports coupled to the master ports of the digital signal processor and second master interface ports; and
        a master unit having first master ports coupled to the second master interface ports of the master interface and second master ports coupled to the application specific integrated circuit on-chip bus;
        wherein said digital signal processor and said master interface operate at a first clock frequency and wherein said generic master unit and said application specific integrated circuit on-chip bus operate at a second clock frequency different than said first clock frequency.

2. The apparatus of claim 1 wherein the master ports of the digital signal processor include external ports of an instruction unit and external ports of a data unit.

3. The apparatus of claim 2 wherein said instruction unit provides signals to read instructions from a slave device.

4. The apparatus of claim 2 wherein said data unit provides signals to selectively read instructions from a slave device or read data from a slave device or write data to a slave device.

5. For a digital signal processor having an instruction unit, a data unit and master ports which include external ports for said instruction unit and external ports for said data unit, an apparatus for connecting a digital signal processor to an application specific integrated circuit on-chip bus as a master comprising:
    a bridge for coupling signals between the master ports of the digital signal processor and an application specific integrated circuit on-chip bus, said bridge comprising:
        an instruction unit master interface having first instruction master interface ports coupled to the external ports of the digital signal processor instruction unit and having second instruction unit master interface ports for providing instruction unit signals in an internal bridge protocol;
        a data unit master interface having first data unit master interface ports coupled to the external ports of the digital signal processor data unit and having second data unit master interface ports for providing data unit signals in the bridge protocol; and
        an arbiter having first arbiter ports coupled to the second instruction unit master interface ports and the second data unit master interface ports and having second arbiter ports selectively providing either said instruction unit signals in the bridge protocol or said data unit signals in the bridge protocol.

6. The apparatus of claim 5 further comprising a generic master unit having first generic master ports coupled to the second arbiter ports and second generic master ports providing signals to said application specific integrated circuit on-chip bus in an application specific integrated circuit on-chip bus protocol.

7. The apparatus of claim 6 wherein said digital signal processor, said instruction unit master interface, said data unit master interface, and said arbiter operate at a first clock frequency, and said generic master unit and said application specific integrated circuit on-chip bus operates at a second clock frequency different than said first clock frequency.

8. The apparatus of claim 7 further including a synchronizer unit coupled between said arbiter and said generic master unit, said synchronizer unit adapted to synchronize selected signals between said first and second clock frequencies.

9. The apparatus of claim 6 wherein said on-chip bus operates in advanced microcontroller bus architecture.

10. The apparatus of claim 9 wherein said on-chip bus operates in advanced high-performance bus protocol.

11. A method for coupling signals between master ports of a digital signal processor and an application specific integrated circuit on-chip bus comprising:
    providing a bridge connecting the master ports of the digital signal processor and the application specific integrated circuit on-chip bus, the bridge having master interface ports coupled to the master ports of the digital signal processor and a generic master port coupled to the application specific integrated circuit on-chip bus;
    said bridge converting signals at the master ports of the digital signal processor from a digital signal processor protocol to an application specific integrated circuit on-chip bus protocol; and
    coupling the converted master port signals to the application specific integrated circuit on-chip bus via the generic master port.

12. The method of claim 11 wherein said step of converting signals at the master ports from the digital signal processor protocol to the application specific integrated circuit on-chip bus protocol further comprises:
    said bridge converting signals at the master ports from digital signal processor protocol to a bridge protocol;
    said bridge converting the bridge protocol signals to the on-chip bus protocol.

13. The method of claim 11 wherein said master ports include external ports of a data unit and external ports of an instruction unit and further comprising:
    said bridge selectively coupling the converted data unit signals and the converted instruction unit signals to the on-chip bus.

14. The method of claim 11 wherein said on-chip bus operates in advanced microcontroller bus architecture.

15. The method of claim 14 wherein said on-chip bus operates in advanced high-performance bus protocol.

16. The method of claim 11 wherein said digital signal processor operates at a first clock frequency and said on-chip bus operates at a second clock frequency different than said first frequency, and further including the step of comprising said bridge synchronizing selected signals between said digital signal processor and said bus, wherein a first portion of said bridge operates at said first frequency and a second portion of said bridge operates at said second frequency.

17. Apparatus for coupling signals between master ports of a digital signal processor and an application specific integrated circuit on-chip bus comprising:

bridge means for converting signals at the master ports of the digital signal processor to signals compatible with the on-chip bus;

wherein said master ports comprise external ports of a data unit and external ports of an instruction unit and wherein said bridge means comprises:

instruction unit master interface means for converting signals at the external ports of the digital signal processor instruction unit to signals compatible with an internal bridge protocol; and data unit master interface means for converting signals at the external ports of the digital signal processor data unit to signals compatible with the bridge protocol.

18. The apparatus of claim 17 further including generic master means for converting instruction unit data unit signals compatible with the internal bridge protocol into signals compatible with the on-chip bus protocol.

19. The apparatus of claim 18, further comprising:

arbiter means for selectively coupling said instruction unit and data unit signals compatible with an internal bridge protocol to said generic master means.

20. The apparatus of claim 18 wherein the on-chip bus operates in advanced microcontroller bus architecture.

21. The apparatus of claim 20 wherein the on-chip bus operates in advanced high-performance bus protocol.

22. The apparatus of claim 19 wherein the digital signal processor operates at a first clock frequency and said on-chip bus operates at a second clock frequency different than said first frequency, further including means for synchronizing selected signals between said digital signal processor and said bus, wherein said instruction unit master interface means, said data unit master interface means and said arbiter means operate at said first clock frequency and said generic master means operates at said second clock frequency.

* * * * *